(12) United States Patent
Arts et al.

(10) Patent No.: US 8,065,684 B2
(45) Date of Patent: Nov. 22, 2011

(54) AUTOMATED SCRIPTING METHODS AND MEDIA

(75) Inventors: Johannes Augustinus Arts, Pflugerville, TX (US); Raymond Silcox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 895 days.

(21) Appl. No.: 12/100,418

(22) Filed: Apr. 10, 2008

(65) Prior Publication Data

US 2009/0260020 A1    Oct. 15, 2009

(51) Int. Cl.
*G06F 13/00* (2006.01)
(52) U.S. Cl. ........................ 719/314; 717/115
(58) Field of Classification Search .............. 719/314; 717/115
See application file for complete search history.

(56) References Cited

U.S. PATENT DOCUMENTS

| 7,032,211 | B1 * | 4/2006 | Janzig et al. | 717/120 |
| 7,065,768 | B1 * | 6/2006 | Janzig et al. | 719/320 |
| 7,296,273 | B2 * | 11/2007 | Kline | 719/314 |
| 7,512,942 | B2 * | 3/2009 | Brown et al. | 717/174 |
| 7,627,854 | B2 * | 12/2009 | Burner et al. | 717/115 |
| 2007/0162891 | A1 | 7/2007 | Burner et al. | |
| 2007/0294708 | A1 * | 12/2007 | Kline | 719/320 |
| 2008/0307388 | A1 * | 12/2008 | Ralls et al. | 717/115 |

* cited by examiner

*Primary Examiner* — Andy Ho
(74) *Attorney, Agent, or Firm* — Garrana Tran LLP; Andrea E. Tran

(57) ABSTRACT

A method for automated scripting includes providing a first menu corresponding to a first object, wherein the first object is a message queue (MQ) object. A first parameter for the first object is received. A second parameter is also received, wherein the second parameter is entered by a user in the first menu. The method further includes creating the first object based on the first parameter and the second parameter.

19 Claims, 12 Drawing Sheets

AUTOMATED SCRIPTING METHODS AND MEDIA

BACKGROUND

1. Technical Field

The present disclosure relates generally to the field of information handling systems. More specifically, but without limitation, the present disclosure relates to methods and media for automated script generation.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Message Queue (MQ) scripting is a method that may be utilized by companies to transport messages between applications (A2A) and in some cases, between applications which reside on multiple IHSs. Software engineers have found it time consuming to create MQ scripts and security scripts to deploy new MQ infrastructures. Because these scripts may be quite lengthy, some engineers may use techniques such as copying and pasting from other scripts to decrease the time needed to create a new script. However, such techniques may make the script extremely vulnerable to reproduction errors, which may cause the scripts to fail when executed.

Thus, a need exists for methods and media for automated scripting, particularly for streamlining and automating the creation of MQ scripts with minimal input from the user.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for automated scripting includes providing a first menu corresponding to a first object, wherein the first object is a message queue (MQ) object. A first parameter for the first object is received. A second parameter is also received, wherein the second parameter is entered by a user in the first menu. The method further includes creating the first object based on the first parameter and the second parameter.

Another aspect of the disclosure provides a method for automated scripting. The method includes providing a plurality of menus corresponding to a plurality of objects, wherein the plurality of objects are message queue (MQ) objects, and receiving at least one parameter in each of the plurality of menus for one of the plurality of objects. The method also includes creating the plurality of objects utilizing the plurality of menus.

Yet another aspect of the disclosure provides a computer-readable medium having computer-executable instructions for performing a method for automated scripting of message queue (MQ) objects. The method includes providing a plurality of menus corresponding to a plurality of objects, wherein the plurality of objects are message queue (MQ) objects, and receiving at least one parameter in each of the plurality of menus for one of the plurality of objects. The method further includes creating the plurality of objects utilizing the plurality of menus.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Although the invention as been described with reference to specific implementations, it will be understood by those skilled in the art that various changes may be made without departing from the spirit or scope of the invention. Various examples of such changes have been given in the forgoing description. Accordingly, the disclosure of implementations of the disclosure is intended to be illustrative of the scope of the invention and is not intended to be limiting. It is intended that the scope of the invention shall be limited only to the extent required by the appended claims. For example, to one of ordinary skill in the art, it will be readily apparent that the information handling system discussed herein may be implemented in a variety of implementations, and that the forgoing discussion of certain of these implementations does not necessarily represent a complete description of all possible implementations.

For simplicity and clarity of illustration, the drawings and/or figures illustrate the general manner of construction, and descriptions and details of well known features and techniques may be omitted to avoid unnecessarily obscuring the disclosure.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
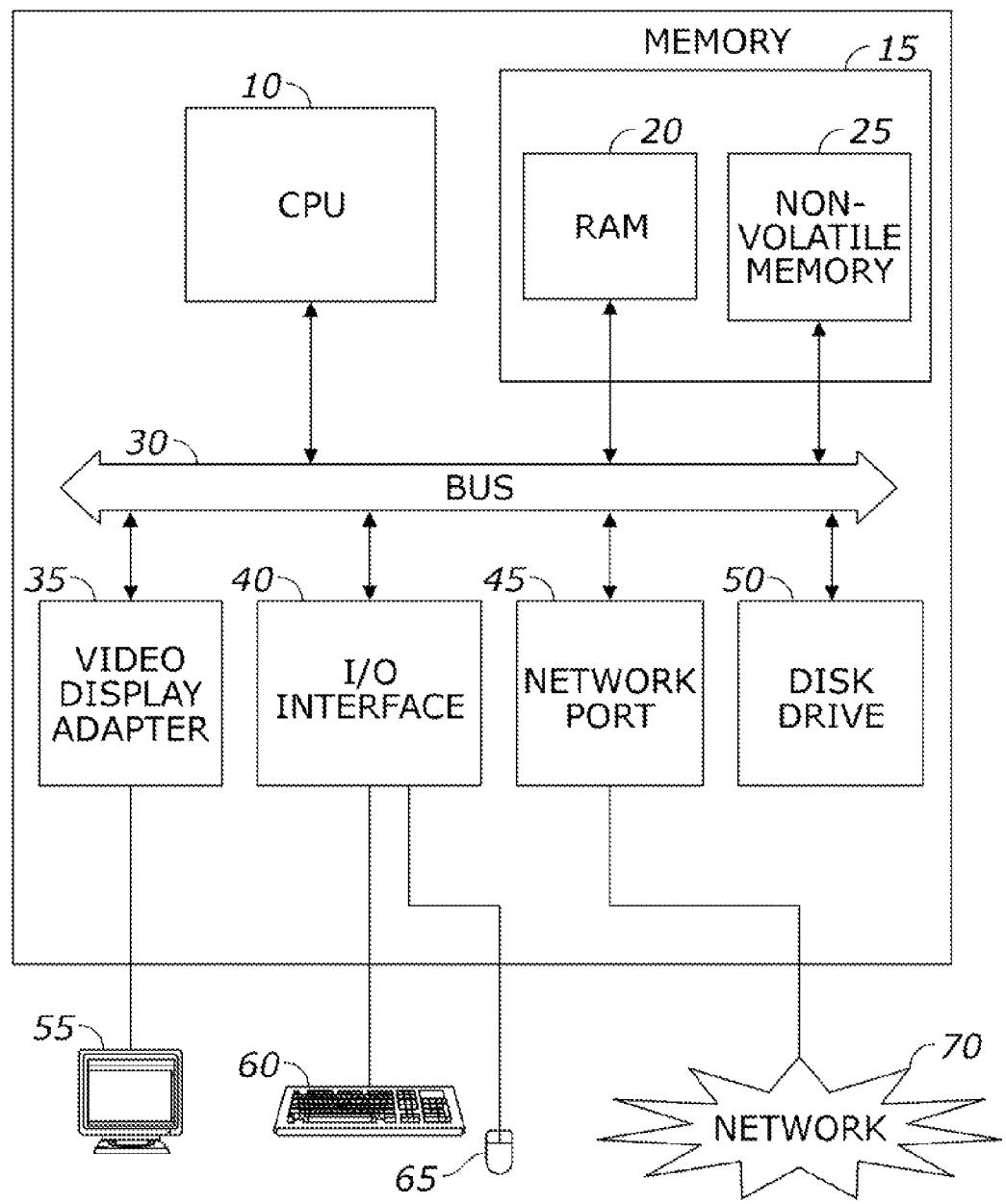
FIG. 1 provides a schematic of an information handling system according to the present disclosure.

FIG. 1 illustrates one possible implementation of an IHS 5 comprising a CPU 10. It should be understood that the present disclosure has applicability to information handling systems as broadly described above, and is not intended to be limited to the IHS 5 as specifically described. The CPU 10 may comprise a processor a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions required to control a keyboard 60, mouse 65, video display 55 and/or other input/output devices not shown here. The memory may also comprise RAM 20. The operating system and application programs may be loaded into the RAM 20 for execution, The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Within an IHS or among multiple IHSs, a message queue (MQ) may allow communication between applications. A message may include any type of data such as character data, numeric data, binary data, a request for information, a command, an image, an executable code, text, extensible markup language (XML), a database, or a combination thereof. A queue may contain several messages and organize the messages in a particular manner, such as first-in-first-out or any suitable manner. An MQ script may provide one or more instructions for managing or processing the messages utilizing one or more queues.

For example, a corporation may wish to have an IHS at a first location that provides sales data to an IHS at headquarters (HQ). By utilizing MQ scripting, the sales data on the IHS at the first location may be provided to HQ, thereby allowing an application at HQ to analyze sales data for the first location. While this example provides one illustration of a potential use for MQ scripting, it is well known to one of ordinary skill in the art that MQ scripting may have many potential uses.

Figure 2:
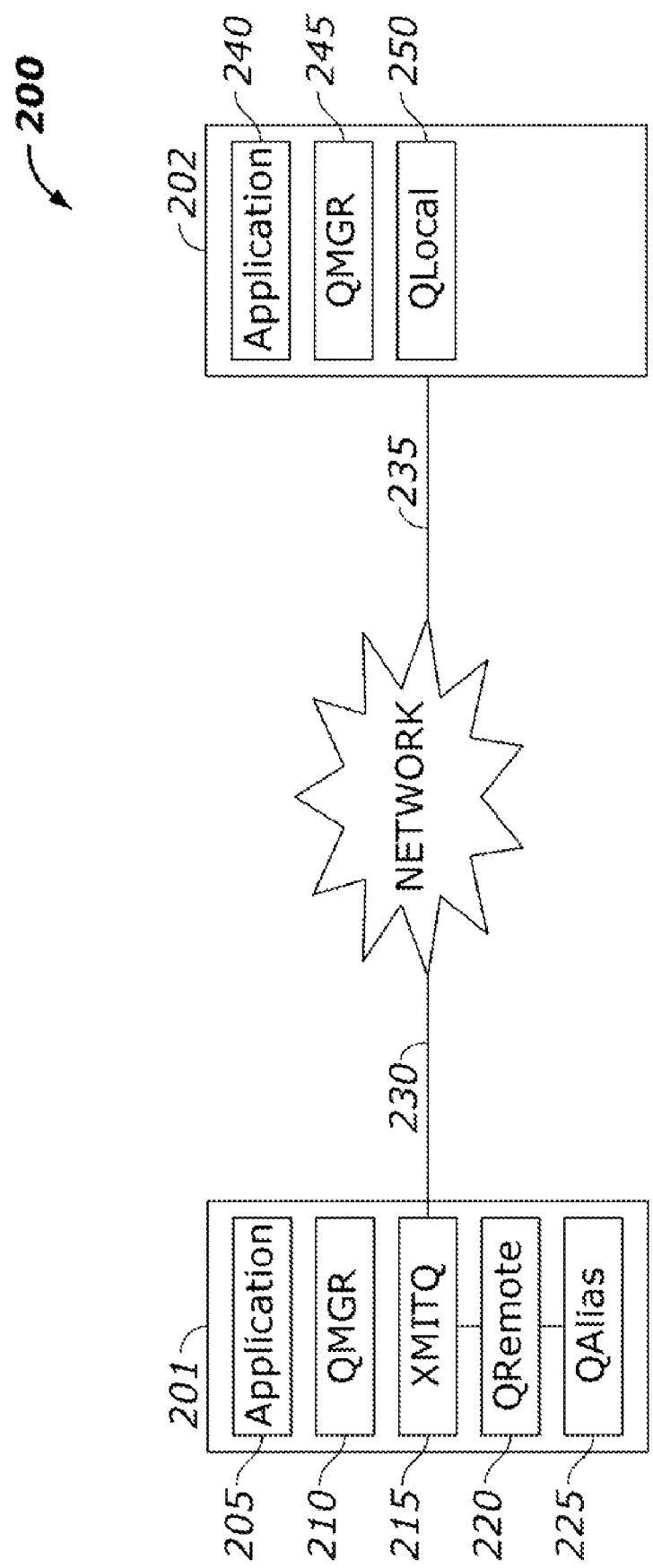
FIG. 2 provides an illustrative implementation of MQ scripting.

Now referring to FIG. 2, an implementation of MQ infrastructure is indicated generally at 200. A first application 205 in a first IHS 201 may want to send a message to a second application 240 in a second IHS 202. A queue manager 210 (e.g., QMgr) may provide an access point for a queue infrastructure. In some cases, an application may access the queue infrastructure only through the queue manager. Once a first application 205 is coupled to a queue manager 210, the first application 205 may call on an alias queue 225 (e.g., QAlias) which may act as a file pointer pointing to another object. An alias queue 225 may not represent an actual queue for the first queue manager 210, but may allow an application to refer to a target queue indirectly. For example, the alias queue 225 may point to a remote queue 220 that represents a local queue 250 (e.g., Qlocal) of a second queue manager 245. A remote queue 220 may be used to define a route to another queue manager 245. A message may be transferred from the remote queue 220 into a transmission queue 215 (e.g., XMITQ). Transmission queues may serve to temporarily store messages from remote queues to be transmitted. A message in the transmission queue 215 may be provided to a MQ sender channel 230. A second IHS 202 comprising the second application 240 may include a receiver channel 235 for receiving data from the MQ sender channel 230. The message from the receiver channel 235 may be stored in a local queue 250. Once the message is stored in the local queue 250, the second application 240 may retrieve the message from the local queue 250.

An MQ script may create several objects such as queue managers, queues, process definitions, channels, namelists, authentication information objects, or the like. MQ objects may provide components of a queue manager needed in order to communicate and accept messages from applications or other queue managers. WebSphere MQ V6 Fundamentals discusses the functions of the variety of different objects that may be utilized for MQ operations as found in Davies, Saida, et al. *WebSphere MQ V6 Fundamentals*, IBM 2005. WebSphere MQ V6 Fundamentals is herein incorporated by reference. Users, such as software engineers, may utilize MQ Series software or modify existing scripts to create new MQ objects. MQ Series software may require a user to enter several parameters to create an object. Alternatively, some users may copy, paste, and modify an existing script to create a new object to suit their preferences.

In order to simplify and improve the process of creating objects, an automated scripting tool for message queuing has been proposed. The proposed automated scripting tool may create objects and scripts with minimal input from a user. The automated scripting tool may have many parameters hard-coded to prevent errors and ensure the integrity of a MQ infrastructure being built. In addition, several parameters entered by a user to define one object or parameters with default values defined by the automated scripting tool may be utilized to pre-populate the parameters for another object. Pre-populating parameters for a first object may include retrieving one or more values from another object to provide one or more values for the parameters of the first object. By pre-populating parameters, the user does not have to re-enter values and typographical errors may be avoided. As a result, the automated scripting tool may reduce the time needed to create MQ objects and security scripts. The automated scripting tool may also prompt a user to create objects needed for a working MQ infrastructure, which may prevent necessary objects from being omitted by the user. For example, when an alias queue object and a remote queue object are created, a working MQ infrastructure may also require a transmit queue object and one or more channel objects. The automated scripting tool may prompt a user to create necessary objects, such as a transmit queue object and channel objects in the example above, if the user forgets to create these objects. The scripting tool may allow a user to immediately deploys, pre-deploy, schedule deployment, or not deploy the scripts. The scripting tool may further provide a script repository utilized after deployment for quick restoration of service(s).

Figure 3:
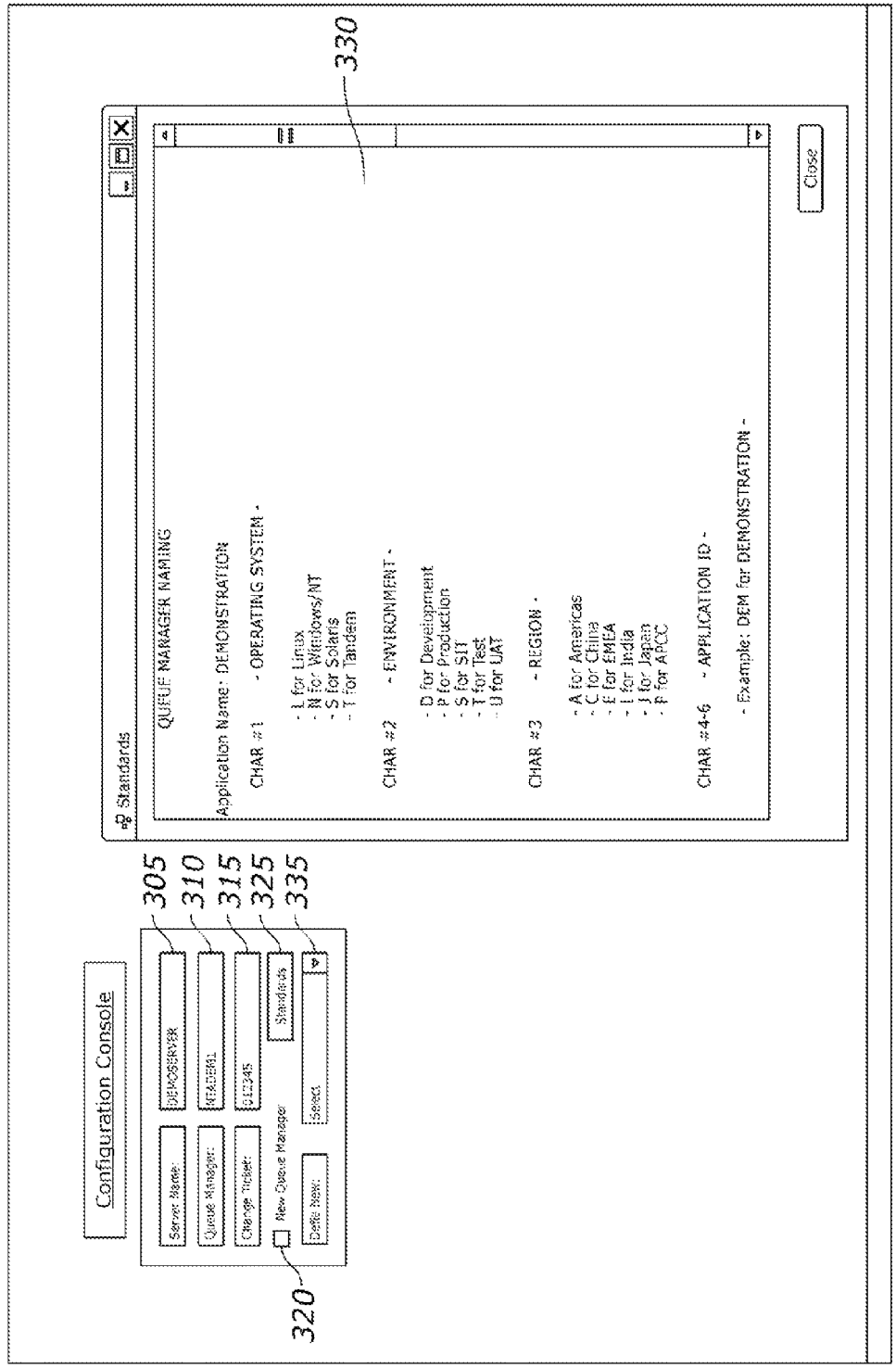
FIG. 3 provides an illustrative implementation a configuration console.

When an automated scripting tool is launched, a user may be prompted to enter a username and password. Once the user is authorized or authenticated, a configuration console indicated at 300 may be provided as represented in the illustrative implementation shown in FIG. 3. A user may enter a server name 305, a queue manager name 310, and a change ticket number 315. These parameters may be used for folder creation, script identification, and deployment. The configuration console 300 may also provide a new queue manager checkbox 320 for indicating if the script is for a new queue manager or an existing queue manager. When a new queue manager checkbox 320 is selected, the automated scripting tool may provide the user with a series of menus that allow a user to create MQ objects and security scripts for a new MQ infrastructure. Each menu may allow a user to select and/or enter different parameters for a corresponding MQ object. The parameters may provide values that affect the operation, management, and control of the objects to be created. Further, the series of menus may prompt the user with object menus that may be necessary to complete a new, working MQ infrastructure. A user may input numerical values, text, or select from a plurality of options in the series of menus. It should be understood that values shown in FIG. 3 are for purposes of illustration only and that any values designated by a user may be inputted for the parameters. In the case that the user does not select the new queue manager checkbox 320, the user may create one or more MQ objects. Furthermore, the user may not be prompted to create additional objects necessary to complete a new, working MQ infrastructure.

A standards button 325 may be selected to display a MQ naming standards template 330. A MQ naming standard 330 may indicate the naming standard utilized by the automated scripting tool. Furthermore, the naming standard may provide a uniform standard for the automated scripting tool which may prevent potential errors common in manually written script. By way of example, the naming standard for a queue manager may utilize a first character to indicate an operating system (OS), a second character to indicate an environment, and a third character to indicate a region. The fourth through sixth characters may provide an application ID, and the seventh character may provide an application number. In another implementation, the naming standard provided may be modified in accordance with a users preferences. The configuration console 300 may also provide a define new drop down menu 335. When the define new drop down menu 335 is selected, a list of objects that may be created utilizing the automated scripting tool may be provided such as alias queue, local queue, transmit queue, remote queue, receiver channel, sender channel, server connection channel, server channel, cluster queue, cluster sender channel, cluster receiver channel, or any suitable object. In the case that the new queue manager checkbox 320 is selected, a series of menus may be provided to a user. The series of menus may include menus needed to create a minimum set of objects needed to provide a working MQ infrastructure. However, a user may select additional objects to be created if additional objects are desired. When the new queue manager checkbox 320 is not selected, only the menus selected may be provided. Once the desired object(s) are selected in from the define new drop down menu 335, a folder containing a MQBDeploy[Queue-Manager Name]_[date-stamp].bat file and a [Queue-Manager Name]_[date-stamp].MQS file may be created. The MQBDeploy[Queue-Manager Name]_[date-stamp].bat file may be a MS-DOS file containing an identification header, new queue manager creation commands, a queue manager or queue object security command, a security refresh command, a save queue manager command, or any suitable batch file data. The [Queue-Manager Name]_[date-stamp].MQS file may provide a text file containing an identification header, instructions for executing the script, and an object definition code. As a user continues through the additional menus, the files discussed above may be updated to include the most recent information.

Figure 4:
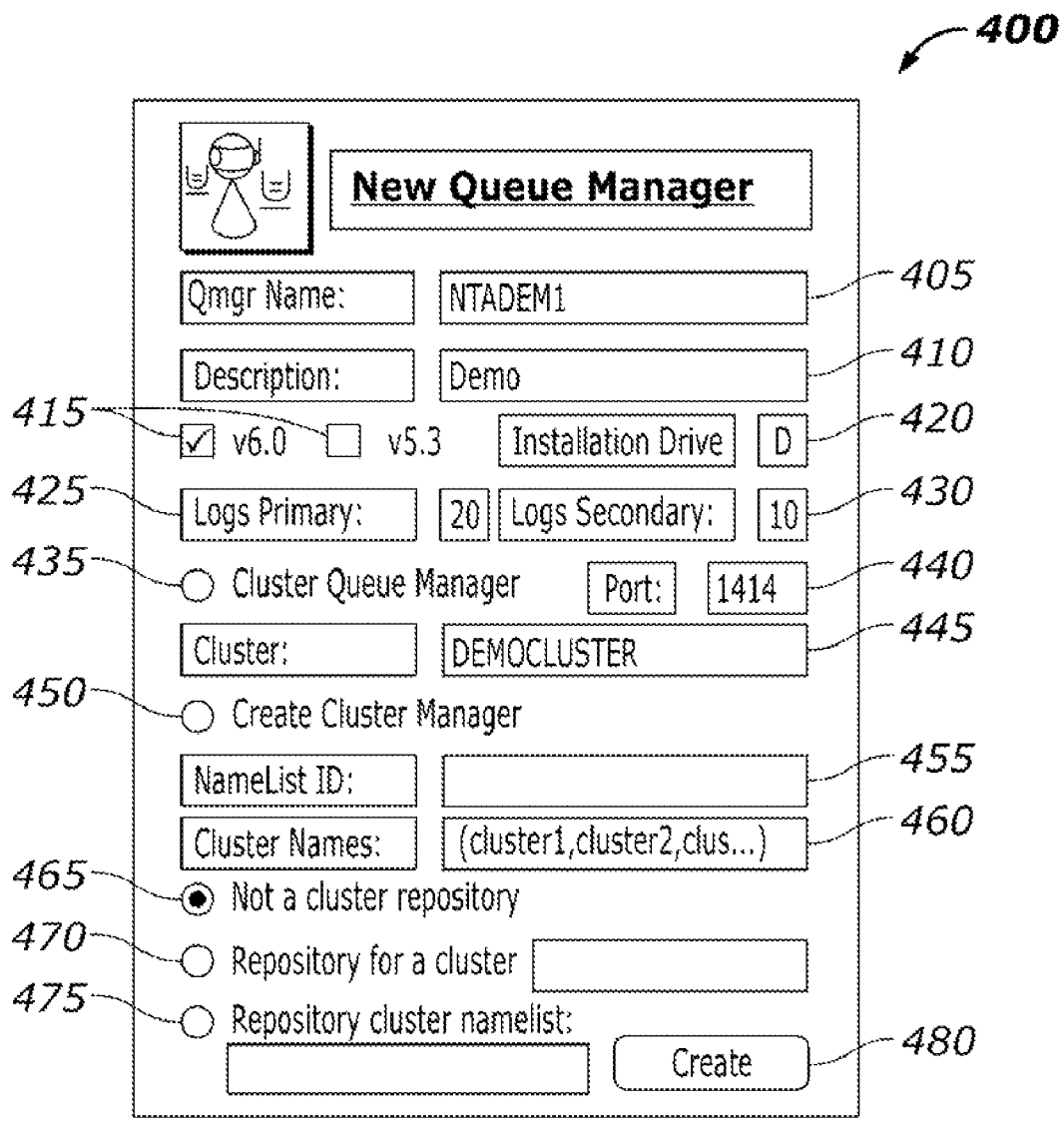
FIG. 4 provides an illustrative implementation of a new queue manager menu.

FIG. 4 provides an illustrative implementation of a new queue manager menu. A new queue manager (QMgr) menu 400 may allow several queue manager parameters to be entered which are mentioned below for purposes of illustration only. For example, the user may enter a queue manager name 405, a QMgr description 410, an installation drive 420, the number of primary logs 425, the number of secondary logs 430, a port 440, a cluster name 445, a namelist ID 455, cluster names 460, a repository for a cluster 470, and a repository cluster namelist 475. However, the queue manager menu may pre-populate one or more parameters with default values (e.g., number of primary logs and secondary logs) or with values entered in the configuration console (e.g., queue manager name). In addition, the user may select a queue manager version 415, whether the queue manager needs to be bound to a cluster 435, whether a cluster namelist should be created 450, and indicate whether or not the cluster is a cluster repository 465, 470, 475.

In the menus discussed herein, one selection or entry may limit the possible selections or entries of another parameter or may allow the entry or selection of additional parameters. For example, the installation drive 420 parameter may not be available when version 5.3 is selected for the queue manager version 415. A user may select create cluster namelist 450, which may allow the user to enter a namelist ID 455 and cluster names 460. Once the queue manager parameters have been entered, the user may selected the create button 480 to proceed to the menus utilized to creating MQ objects.

In each of the MQ object menus discussed herein, object parameters may be pre-populated from previous menus and/or default values defined by the automated scripting tool. For example, some parameters for one or more objects may be hard-coded into the code for the automated scripting tool. Additionally, some parameters for an object, such as hard-coded parameters, may not be displayed in a corresponding object menu. As discussed previously, a user may choose to create one or more objects or a new queue manager. As a result, the sequence in which the MQ object menus may vary and the claims are in no way limited to any sequence in which the menus are discussed. Further, in some cases, parameters that may be pre-populated in a current menu from a user input in a previous menu or parameters from a previous object may not have been previously provided. In such cases, the user may enter the parameters or the parameter may be pre-populated from default values defined by the automated scripting tool.

Figure 5:
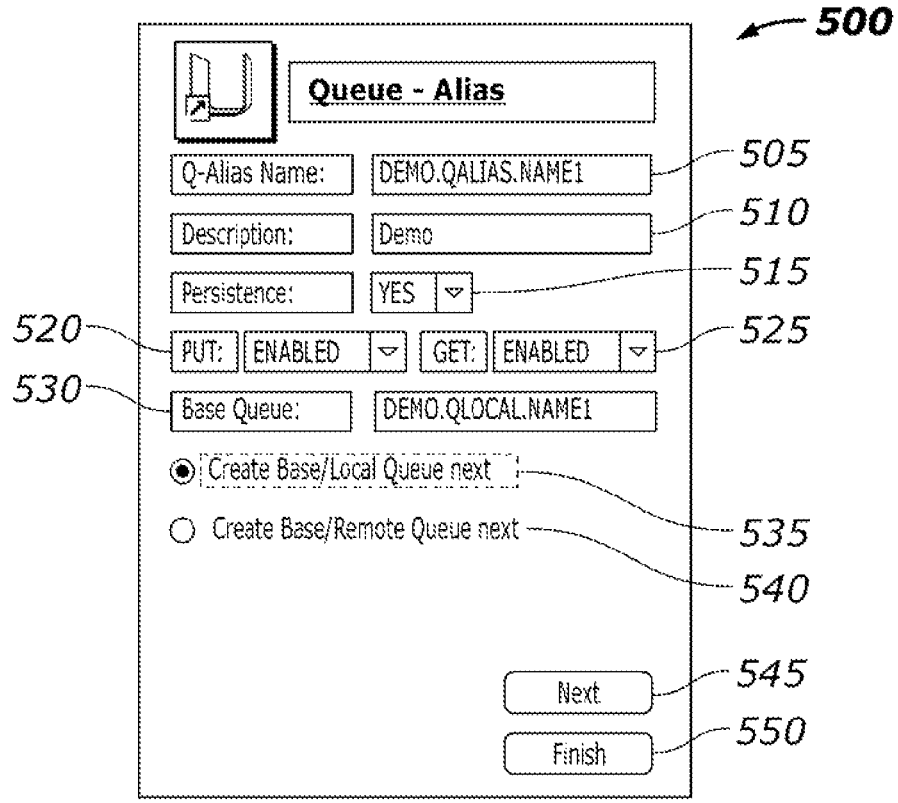
FIG. 5 provides an illustrative implementation of an alias queue menu.

FIG. 5 provides an illustrative implementation of an alias queue menu, indicated generally at 500. A user may enter several alias queue (QAlias) parameters such as, for example, an alias queue name 505, a QAlias description 510, and a base queue name 530. The user may select yes or no for QAlias messaging persistence 515 depending on whether the messages contain critical data. Message persistence may allow a message to survive system failures and restarting of the queue manager. The user may enable or disable QAlias PUT 520 or QAlias GET 525 function which may respectively allow messages to be "put" or "get" from a queue. The alias queue menu 500 may allow a user to create a base/local queue next 535 or a base/remote queue next 540. If the next button 545 is selected, the user may proceed to the next menu corresponding to the type of queue the user selected. Further, the base queue 530 name entered by a user may be pre-populated into the next menu. However, the user may alternatively select the finish button 550 to begin creating the MQ scripts/files and to proceed to a script deployer menu (discussed below). In addition to the alias queue parameters shown in the alias queue menu 500, several other default alias queue parameters may be defined. Some of the parameters, including parameters that are not shown, may be passed on or pre-populated for the additional objects to be created.

Figure 6:
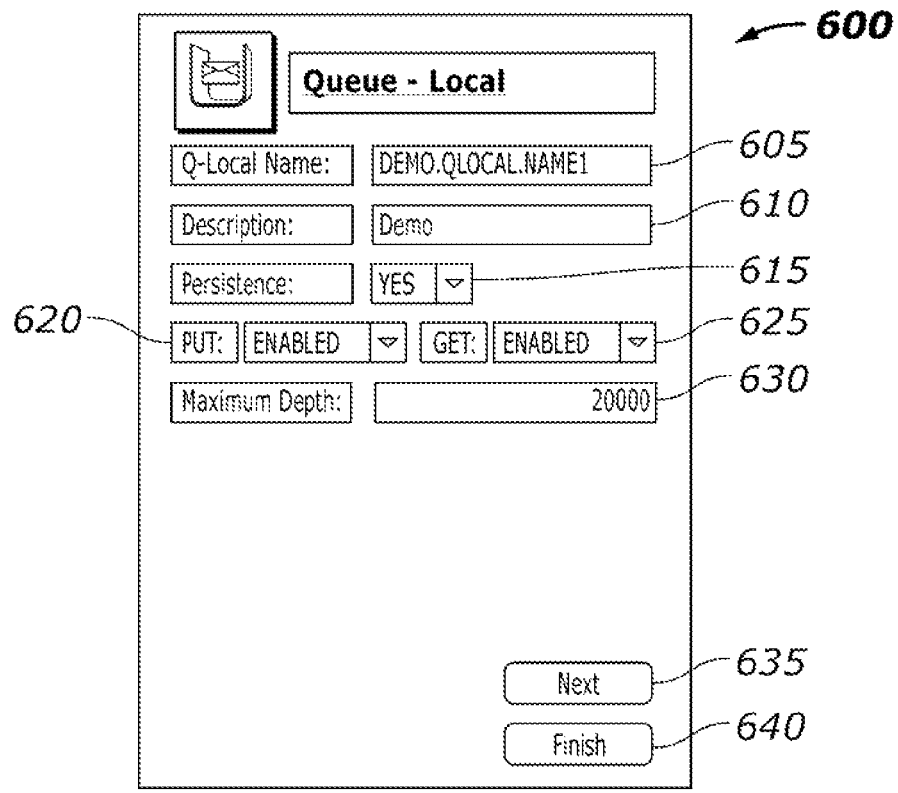
FIG. 6 provides an illustrative implementation of a local queue menu.

FIG. 6 provides an illustrative implementation of a local queue menu, indicated generally at 600. In the local queue (Qlocal) menu 600, a user may enter, for example, a local queue name 605, a Qlocal description 610, and a Qlocal maximum depth 630 for a local queue. The local queue menu 600 may also allow Qlocal PUT 620 and Qlocal GET 625 functions to be enabled or disabled and Qlocal persistence 615 to be activated or deactivated for the local queue. In the case that the user previously created an alias queue, the local queue name 605 may be pre-populated by the name entered in an alias queue menu. In addition, other local queue parameters from alias queue parameters not shown in the local queue menu 600 may be pre-populated or may be defined by default values. Once the local queue parameters are entered, a user may select the next button 635 to proceed to a next logical menu. The next logical menu may be the menu used to create the next logical object needed for the MQ infrastructure. For example, when a remote queue is created, the next logical object (i.e., a transmit queue) may also be created. However, when a local queue is created, a transmit queue may not be needed. Alternatively, the finish button 640 may be selected to proceed to a script deployer menu and to start generating MQ scripts/files for local queue object as well as any additional objects to be created.

Figure 7:
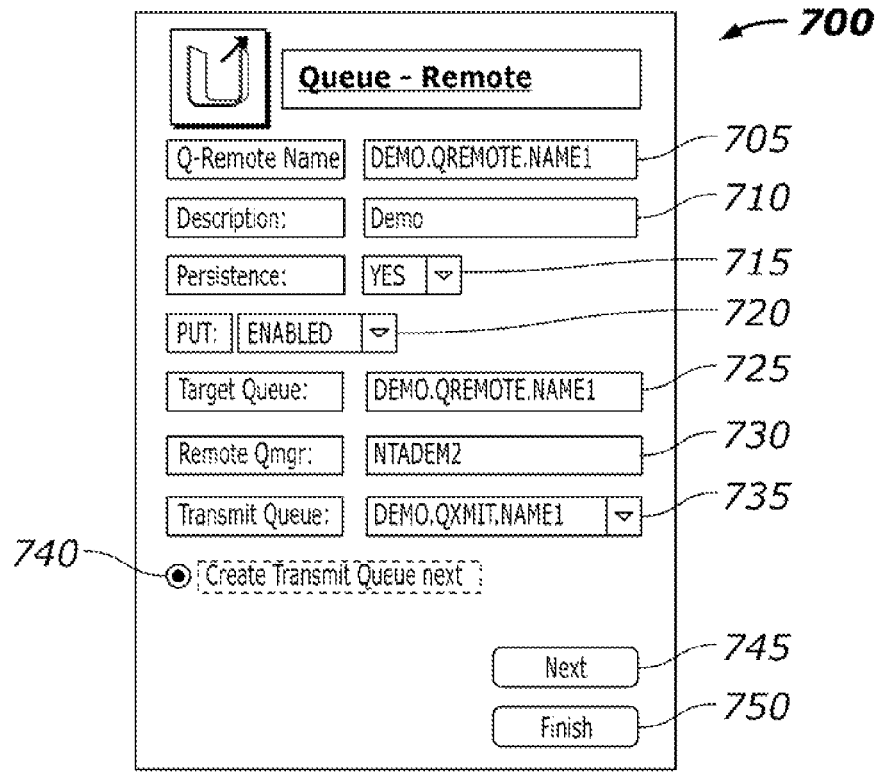
FIG. 7 provides an illustrative implementation of a remote queue menu.

FIG. 7 provides an illustrative implementation of a remote queue menu indicated generally at 700. The parameters for a remote queue (Qremote) that a user may enter or select may include a remote queue name 705, a Qremote description 710, Qremote persistence 715, Qremote PUT 720, target queue 725, remote queue manager 730, and Q remote transmit queue 735. In the case that a user selected create base/remote queue next in the alias queue menu, the user may proceed to the remote queue menu 700 and the remote queue name 705 may be pre-populated based on the base queue name entered in the alias queue menu.

If create transmit queue next 740 is selected, then clicking the next button 745 may allow a user to proceed to a transmit queue menu. The name of the transmit queue 735 selected from the drop down menu may be pre-populated as a transmit queue name in the transmit queue menu. If create transmit queue next 740 is not selected, then selecting the next button 745 may allow the user to proceed to defining a next object. The parameters entered in the remote queue menu 700 may be stored and the remote queue menu 700 may be cleared so that the user may begin creating the next object. The user may begin creating another object by selecting an object from the define new drop down menu in the configuration console. If the user selects the finish button 750, the automated scripting tool may proceed to a script deployer menu and begin creating the scripts/files for a remote queue object and any other objects to be created.

Figure 8:
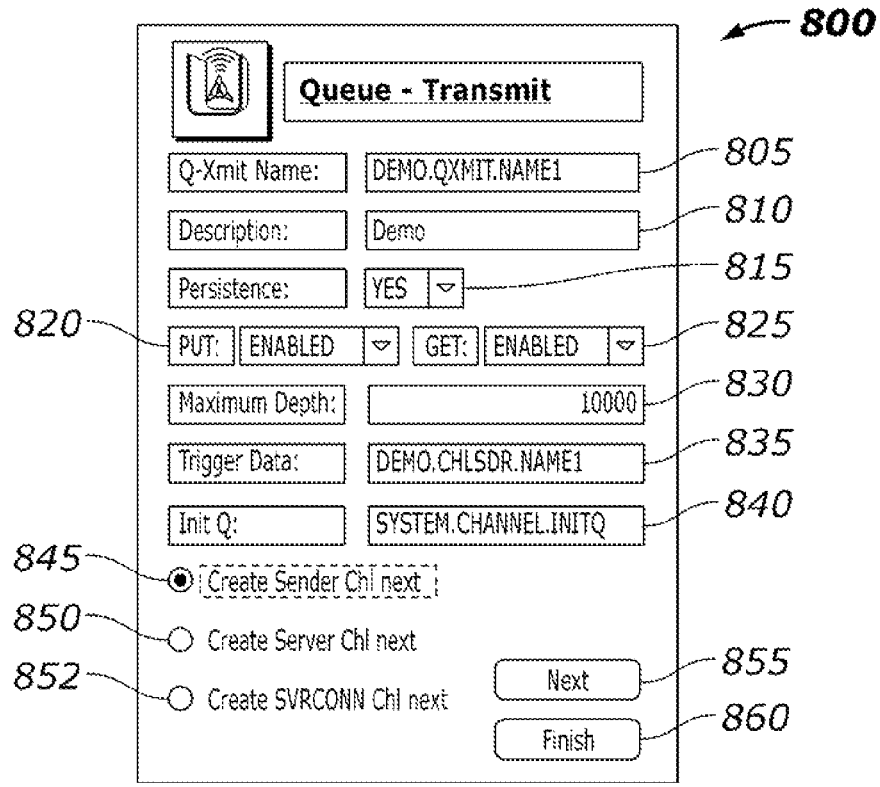
FIG. 8 provides an illustrative implementation of a transmit queue menu.

FIG. 8 provides an illustrative implementation of a transmit queue menu indicated generally at 800. In a transmit queue menu 800, the user may enter a transmit queue (QXmit) name 805, a QXmit description 810, a QXmit maximum depth 830, a trigger data name 835, and an initial queue name 840. The user may also choose to enable or disable QXmit PUT 820 or QXmit GET 825 functions and to allow or disallow QXmit persistence 815. Once a user has entered or selected parameters for the transmit queue, the user may select create sender channel next 845, create server channel next 850, or create SVRCONN channel next 852. If a next button 855 is selected, then the user may proceed to a menu for creating an object corresponding to the type of channel selected. Further, the trigger data 835 may be utilized to pre-populate the channel name of the channel to be created. If none of the channels are selected and the next button 855 is selected, then a channel object is not created and the user may proceed to the next object. For example, the fields in the transmit queue menu 800 may be cleared, and the user may begin creating a next object by selecting the define new button in the configuration console. If a finish button 860 is selected, then the scripts/files for the objects to be created are generated and the user may continue to a script deployer menu.

Figure 9:
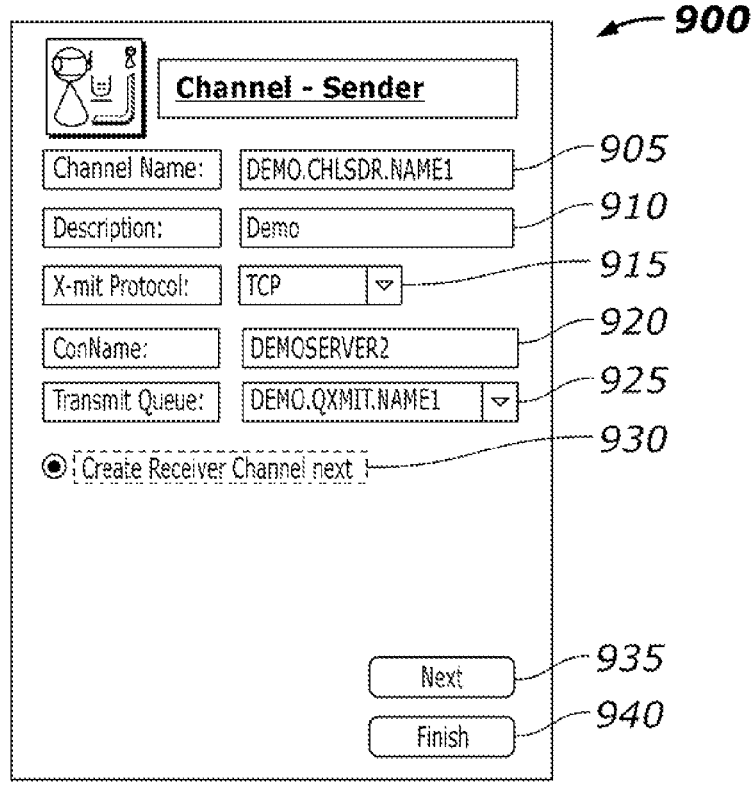
FIG. 9 provides an illustrative implementation of a sender channel menu.

Now referring to FIG. 9, an illustrative implementation of a sender channel menu is indicated generally at 900. A user may enter a sender channel name 905, a sender channel description 910, and a sender channel connection name 920. The user may also select a sender channel transmit protocol 915 such as a transmission control protocol (TCP), sequenced packet exchange (SPX), network basic input output system (NetBIOS), logical unit type 6.2 (LU 6.2), or any other suitable protocol. Furthermore, a sender channel transmit queue 925 may be selected from a drop down menu. The user may choose to create a receiver channel next by selecting create receiver channel next 930 and clicking on the next button 935. If the user does not want to create a receiver channel object, then the user may select the finished button 940 to begin generating the scripts/files for the objects to be created and proceed to a script deployer menu.

Figure 10:
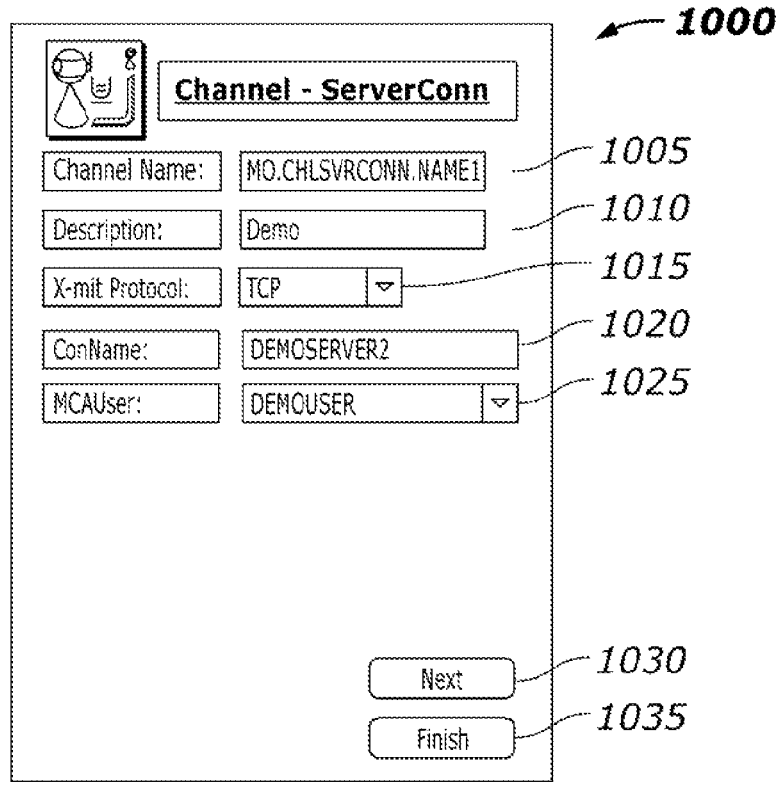
FIG. 10 provides an illustrative implementation of a server connection channel menu.

Next, FIG. 10 provides an illustrative implementation of a server connection (ServerConn) channel menu indicated generally at 1000. In the server connection channel menu 1000, a user may enter a ServerConn channel name 1005, a ServerConn description 1010, a ServerConn connection name 1020, and a ServerConn message channel agent (MCA) user 1025. The user may also select a ServerConn transmit protocol 1015 such as TCP, SPX, NetBIOS, LU 6.2, or the like. After all the server connection channel parameters have been selected or entered, the user may begin creating a next object by selecting a next button 1030. The user may begin creating the next object by selecting a desired object from the define new drop down menu in the configuration console. Alternatively, the user may select a finish button 1035 to start generating the scripts/files for the objects and continue to a script deployer menu.

Figure 11:
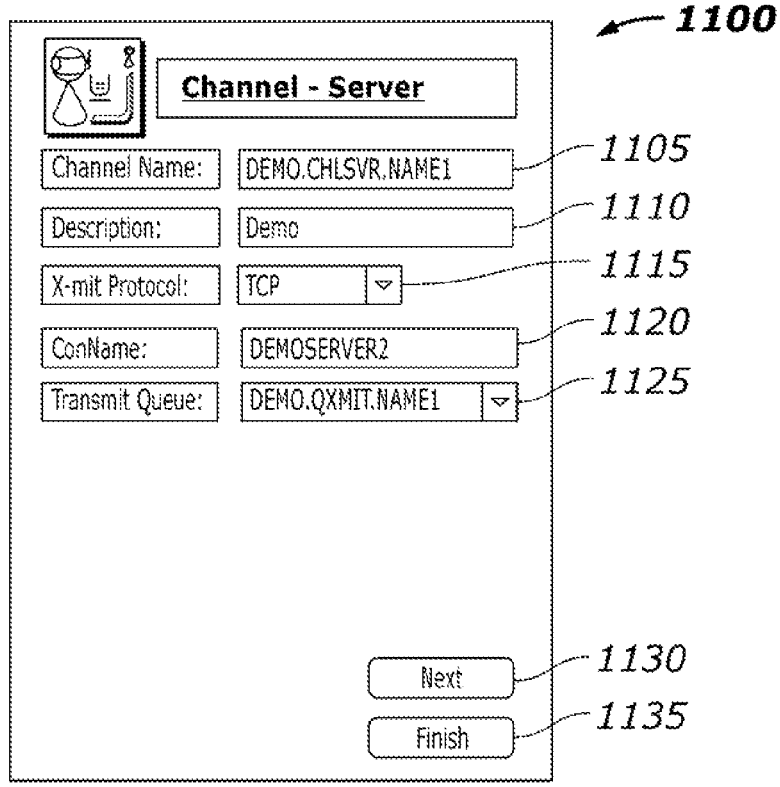
FIG. 11 provides an illustrative implementation of a server channel menu.

Referring now to FIG. 11 an illustrative implementation of a server channel (SvrChl) menu is shown referenced by 1100. In the server channel menu 1100, a user may enter a SvrChl channel name 1105, a SvrChl description 1110, and a SvrChl connection name 1120 for a server channel object to be created. In the menu, the user may further select a SvrChl transmit queue 1125 and a SvrChl transmit protocol 1115. Similar to the menus mentioned previously, the user may select a SvrChl transmit protocol 1115 such as TCP, SPX, NetBIOS LU 6.2, or the like. The user may a next button 1130 to begin creating a next object by selecting an object from the define new drop down menu of the configuration console. Alternatively, the user may select a finished button 1135 to begin generation of the scripts/files for the object and to continue to the script deployer menu.

Figure 12:
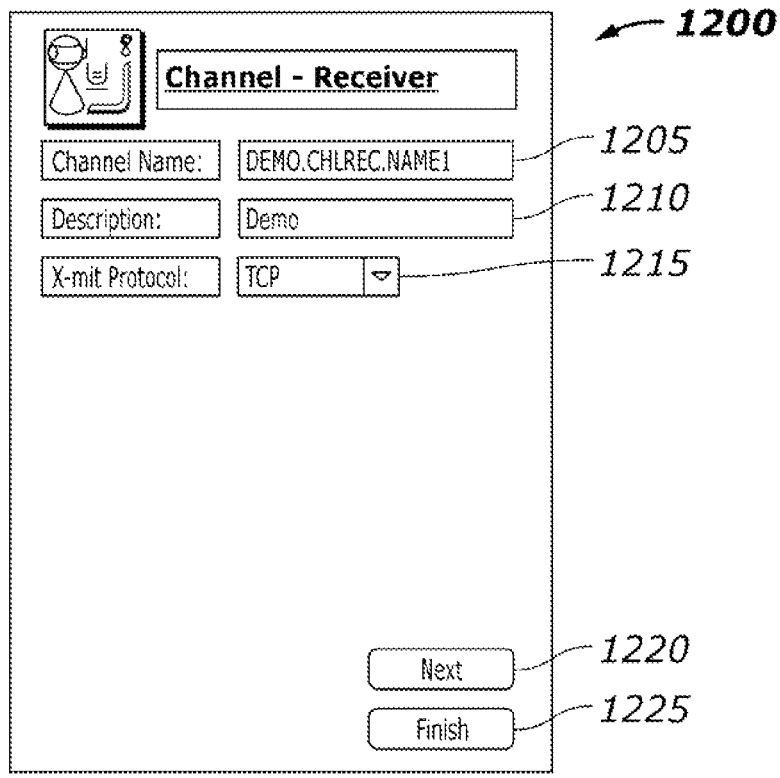
FIG. 12 provides an illustrative implementation of a receiver channel menu.

Continuing with the figures, FIG. 12 represents an illustrative implementation of a receiver channel menu indicated generally at 1200. In a receiver channel menu 1200, a user may enter a receiver channel name 1205 and a receiver channel description 1210 and select a transmit protocol 1215. Similar to the menus mentioned previously, the user may select a receiver channel transmit protocol 1215 such as TCP, SPX, NetBIOS, LU 6.2, or the like. If a next button 1220 is selected, the user proceeds to creating a next object by selecting an object from the define new drop down menu in the configuration console. If a finished button 1225 is selected, the scripts/files for objects may be generated.

Figure 13:
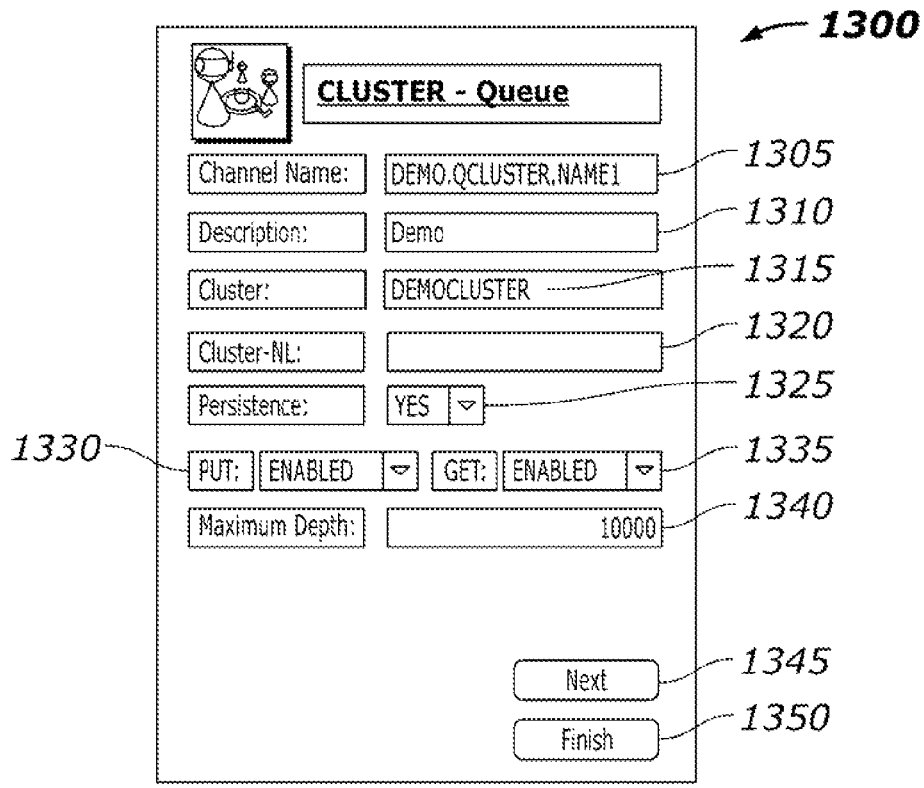
FIG. 13 provides an illustrative implementation of a cluster queue menu.

FIG. 13 provides an illustrative implementation of a cluster queue (QCluster) menu indicated generally at 1300. A cluster may provide a group of queue managers that communicate directly with each other without utilizing a transmit queue, channel, and/or remote queue. As a result, a next logical object may not need to be created for a cluster queue in a new MQ infrastructure. A user may enter a cluster queue (QCluster) name 1305, a QCluster description 1310, a QCluster name 1315, a QCluster name list 1320, and a QCluster maximum depth 1340 for a cluster queue object. The user may activate or deactivate QCluster message persistence 1325, and enable or disable QCluster PUT 1330 and QCluster GET 1335 functions. Once the cluster queue parameters have been established in the cluster queue menu 1300 the user may select the next button 1345 to proceed to creating another object. As in the previous object menus, the entered parameters may be stored and cleared and the user may select the next object to be created from the define new drop down menu in the configuration console. Alternatively, the user may select the finish button 1350 to create the scripts and files for a cluster queue object and to proceed to a script deployer menu.

Figure 14:
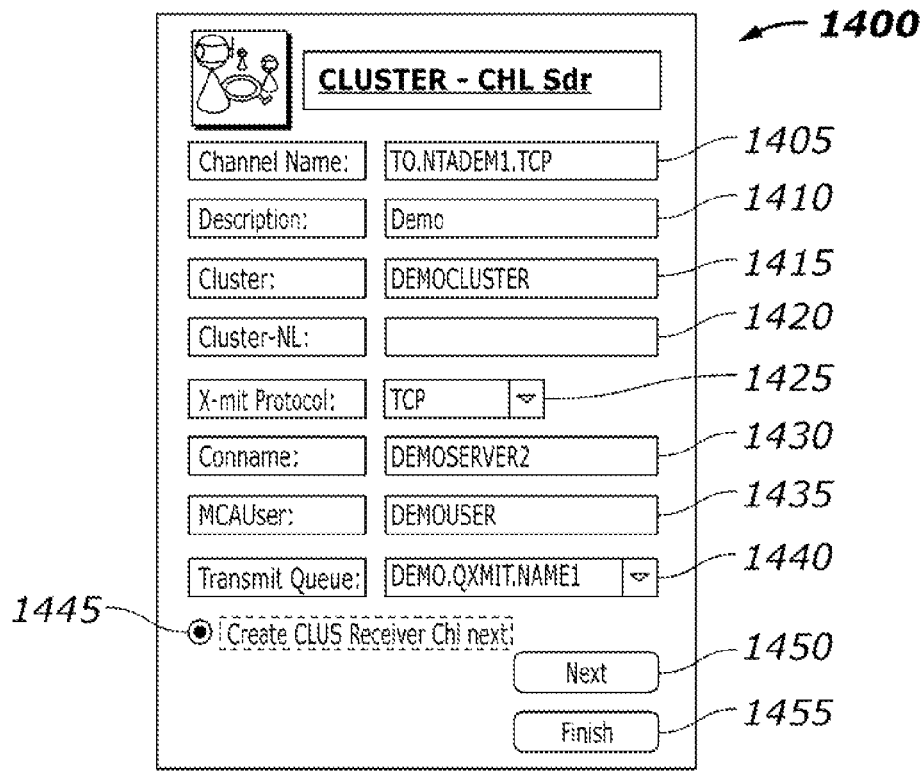
FIG. 14 provides an illustrative implementation of a cluster sender channel menu.

FIG. 14 provides an illustrative implementation of a cluster sender channel ChlSdr) menu indicated generally at 1400. The cluster sender channel menu 1400 may allow a user to enter a cluster ChlSdr channel name 1405, a cluster ChlSdr description 1410, a cluster ChlSdr cluster name 1415, a cluster ChlSdr cluster name list 1420, a cluster ChlSdr connection name 1430, and a cluster ChlSdr MCA user 1435. In addition, a user may select a cluster ChlSdr transmit protocol 1425 such as TCP, SPX, NetBIOS, LU 6.2, or the like and a cluster ChlSdr transmit queue 1440 for the cluster sender channel object to be created. If the user selects create cluster receiver channel next 1445 and activates the next button 1450, the user may proceed to a cluster receiver channel menu. If the user only selects the next button, the user may begin creating the next object by selecting an object from the define new drop down menu of the configuration console. If the user chooses the finish button 1455, then the scripts and files for a cluster sender channel object may be generated and the user may proceed to a script deployer menu.

Figures 15, 16:
FIG. 15 provides an illustrative implementation of a cluster receiver channel menu.
FIG. 16 provides an illustrative implementation of a security menu.

Moving on to FIG. 15, an illustrative implementation of a cluster receiver channel (ChlRec) menu is provided and indicated generally at 1500. In the cluster receiver channel menu 1500, a user may enter a cluster ChlRec channel name 1505, a cluster ChlRec description 1510, a cluster ChlRec name 1515, a cluster ChlRec name list 1520, a cluster ChlRec connection name 1530, and an MCA user 1535. The user may also select a transmit protocol 1525 such as TCP, SPX, NetBIOS, LU 6.2, or the like. When all of the parameters in the cluster receiver channel menu 1500 have been entered, the user may select next 1540 to start creating another object or finish 1545 to continue to a script deployer menu.

In each of the queue, channel, and cluster menus discussed in the present disclosure, several queue, channel, or cluster parameters may be entered or selected by a user. The parameters shown in each of the queue, channel, and cluster menus are provided as exemplary implementations for purposes of illustration only, and the menus are in no way limited to the particular parameters shown. It is recognized by one of ordinary skill in the art that parameters may be added or removed from the menus as desired to accommodate different preferences. Additionally, since some of the parameters for queues, channels, and clusters may be pre-defined by the automated scripting tool, every possible parameter for the queues, channels, and clusters may not need to be shown in the queue, channels and cluster menus.

The automated scripting tool may also generate security scripts as well. The security scripts may secure access to a queue manager and associated queues in accordance with the setting(s) selected by a user in a security menu. Now referring to FIG. 16, an illustrative implementation of a security menu is indicated generally at 1600. The security menu 1600 may automatically be provided when a user has configured any type of queue. In another implementation, the automated scripting tool may provide a default security setting that may be altered by accessing the security menu 1600. The queue manager name (e.g., NTADEM1) and the queue (e.g., DEMOI.QLOCAL.NAME1) that security is to be set for may be pre-populated from data entered in the previous menus. The user may optionally set a default security string for which all application accounts in the message queue interface (MQI) group may have access to by selecting apply default security string 1605. The user may configure the security string for a specified user-group/account by selecting apply wildcard security string 1610. The user may set a wild-card security string which encompasses multiple queues by selecting wildcard security applies 1615. Once a selection has been made the user may optionally configure another security group/account by selecting the set button 1620 if wildcard security applies 1615 has not been selected. When the user activates the set button 1620, the security script(s) may then be generated.

Figure 17:
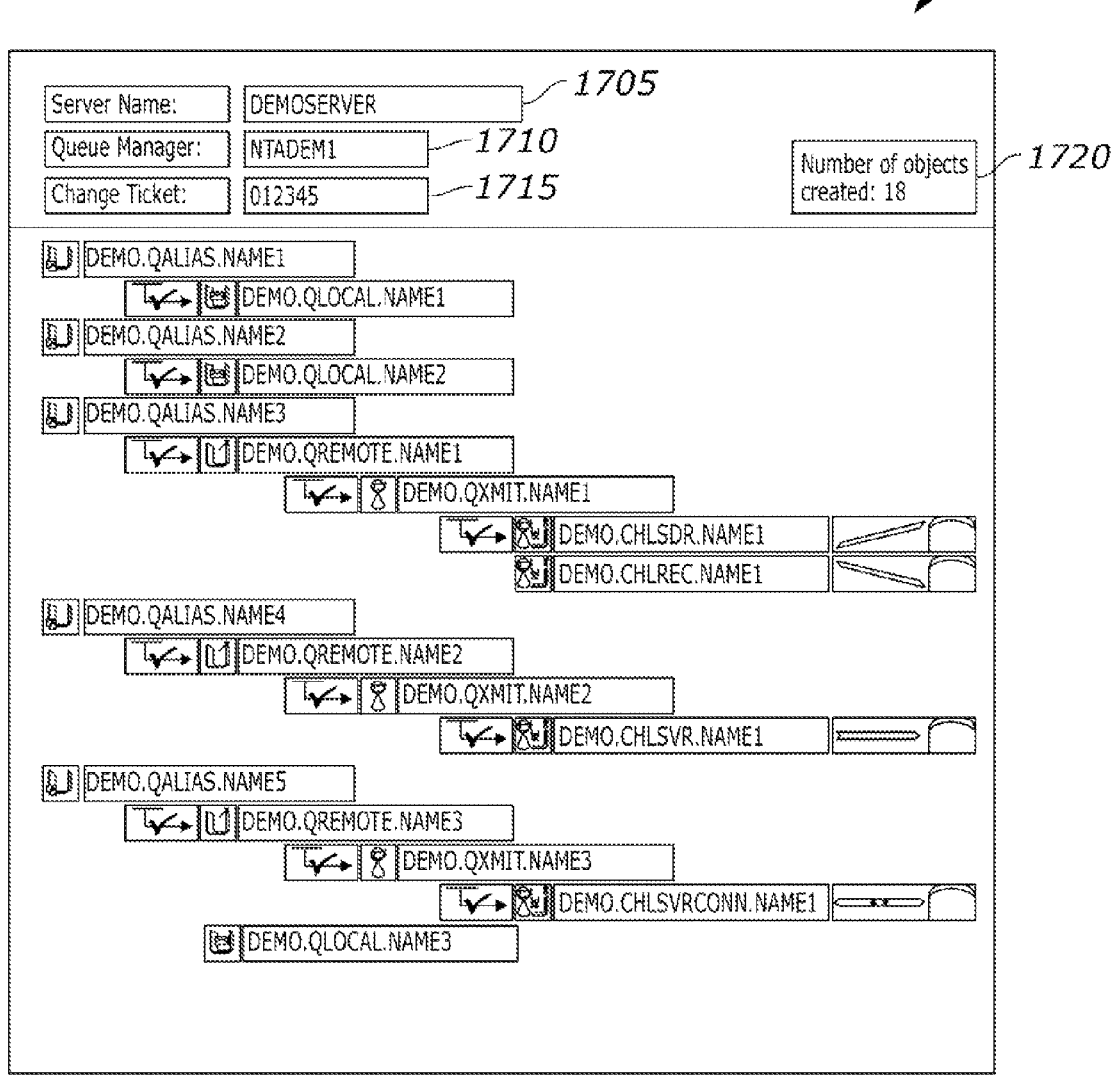
FIG. 17 provides an illustrative object configuration diagram.

Next, FIG. 17 represents an example of an object configuration diagram indicated at 1700. An object configuration diagram may provide a visual representation of objects created by the automated scripting tool and the relationship between the objects. As the automated scripting tool creates objects, the objects may be dynamically added to the object configuration diagram 1700. The object configuration diagram 1700 may indicate parameters including, but not limited to, a server name 1705, a queue manager name 1710, a change ticket number 1715, and a total number of objects created 1720. The object configuration diagram 1700 may also illustrate the objects created by the automated scripting tool as well as the relationship between the objects. For example, a first set of objects may include a first alias queue (i.e., DEMO.QALIAS.NAME1) and a local queue (i.e., DEMO.QLOCAL.NAME1). As discussed previously, a minimum set of objects may be needed to provide a working MQ infrastructure, but additional objects may be included if desired. For example, the fifth set of objects may include a fifth alias queue (i.e.: DEMO.QALIAS.NAME5) and a third local queue (i.e., DEMO.QLOCAL.NAME3). While additional objects may not be needed to form a working MQ infrastructure, additional objects may be desired such as a third remote queue (i.e., DEMO.QREMOTE.NAME3), a third transmit queue (i.e., DEMO.QXMIT.NAME3), and first server connection channel (i.e., DEMO.CHLSVRCONN.NAME). It should be understood that the additional objects named above are for the purposes of illustration only and that any suitable additional object(s) may be created and/or selected.

Figure 18:
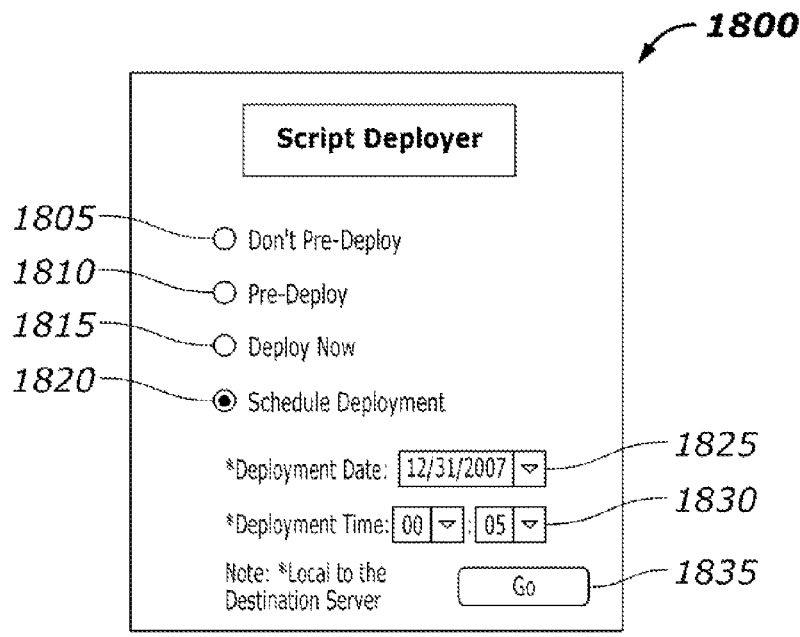
FIG. 18 provides an illustrative implementation of a script deployer menu.

FIG. 18 provides an illustrative implementation of a script deployer menu indicated generally at 1800. In a script deployer menu 1800, a user may select deployment options such as, for example, do not pre-deploy 1805, pre-deploy 1810, deploy now 1815, and schedule deployment 1820. If the user chooses not to pre-deploy and selects do not pre-deploy 1805, the automated scripting tool may store the generated files on the local system. If the user selects pre-deploy 1810, the deployment may be pre-staged by copying files to a directory on the remote system that the script is to be deployed on. If the user selects deploy now 1815, the deployment may be pre-staged by copying files to a directory on the remote system as is done for pre-deployment. In addition, a scheduled task on the remote system may be set to execute a batch file that calls the MQ script file after pre-staging is complete. If a user selects schedule deployment 1820, deployment may be pre-staged like the pre-deploy 1810 and deploy now 1815 options. Additionally, a scheduled task on the remote system may be set to execute a batch file at a specified deployment date 1825 and time 1830. Once the user has selected a desired deployment method, the Go button 1835 may be selected to apply the selected deployment method. Any MQ script may then be backed up in a script repository for disaster recovery so that services may be quickly restored when needed. In addition, the script repository may also indicate a deployment time of the stored MQ scripts.

Figure 19:
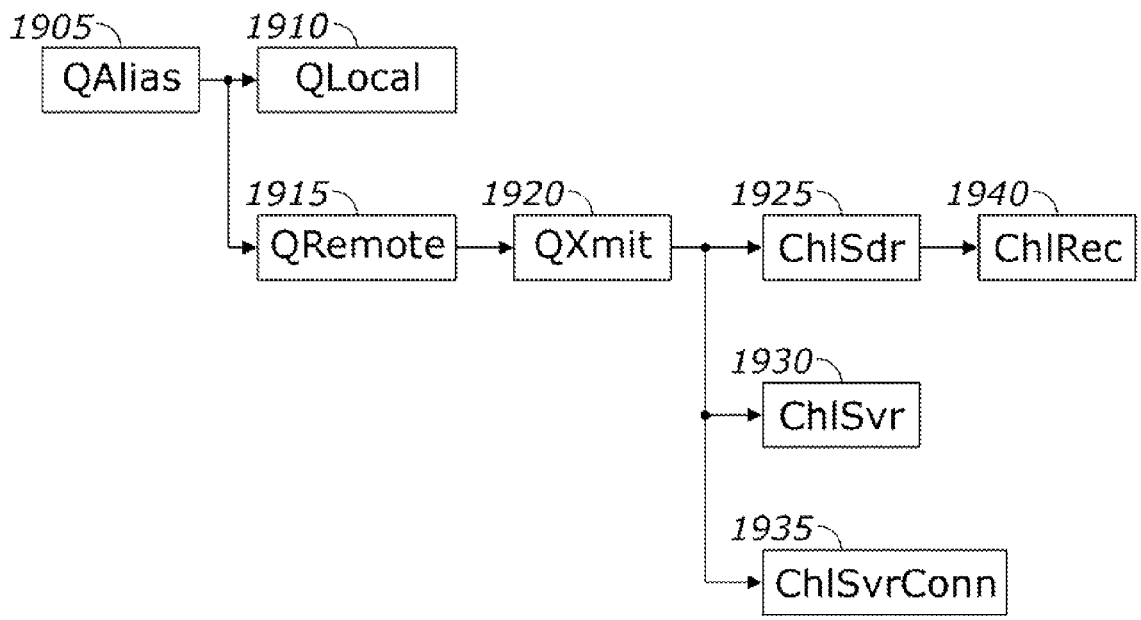
FIG. 19 provides an illustrative diagram of the flow of logical objects in a MQ infrastructure.

Finally, FIG. 19 represents an illustrative diagram of the flow of logical objects in a MQ infrastructure. When a MQ infrastructure is created, the creation of some objects may require the creation of associated objects. The logical flow of the objects indicates which objects may be created following a particular object. When the user chooses to create a new queue manager in the configuration console, a series of menus corresponding to the logical flow of the objects may be provided. Consequently, this provides a "flow control" that may prevent the user from omitting MQ objects. After an alias queue 1905 is created, a local queue 1910 or a remote queue 1915 may be created. If a local queue 1910 is created, then additional objects may not be needed unless the user wishes to add additional objects. If a remote queue 1915 is created, a user may also create a transmit queue 1920. Once a transmit queue 1920 is created, a user may create a sender channel 1925, a server channel 1930, or a server connection channel 1935. If a server channel 1930 or a server connection channel 1935 is created, no additional objects may be needed. If a sender channel 1925 is created, then a user may also create a receiver channel 1940. Since cluster queuing operates in a different manner than the distributed queuing discussed above, cluster queues are omitted from the diagram because they may not require multiple objects to be created.

Various methods are contemplated including all or less than all of the steps described herein and/or mentioned below, any number of repeats or any of the steps shown and/or mentioned below, and performance of the steps in any order.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method for automated scripting, the method comprising:
   providing a first menu corresponding to a first object, wherein the first object is a message queue (MQ) object;
   receiving a first parameter for the first object;
   receiving a second parameter, wherein the second parameter is entered by a user in the first menu;
   creating the first object based on the first parameter and the second parameter;
   selectively prompting the user with a plurality of menus associated with the first menu based on the first object created, wherein each of the plurality of menus is associated with one of a plurality of objects and the plurality of objects provide a working MQ infrastructure;
   receiving a pre-populated parameter in a second menu, wherein the pre-populated parameter was entered by the user in the first menu provided prior to the second menu; and
   creating the plurality of objects utilizing data entered in the plurality of menus.

2. The method of claim 1, wherein the plurality of objects are selected from a group consisting of an alias queue object, a local queue object, a remote queue object, a transmit queue object, a sender channel object, a server connection channel object, a server channel object, a receiver channel object, a cluster queue object, a cluster sender channel object, a cluster receiver channel object, and a combination thereof.

3. The method of claim 1, wherein the first parameter is embedded within code for an automated scripting tool.

4. The method of claim 1 further comprising,
pre-staging deployment for the first object after the first object is created, wherein the first object is pre-deployed, deployed immediately, or deployed at a scheduled date and time.

5. The method of claim 1, wherein a security script is generated for the first object.

6. A method for automated scripting, the method comprising:
providing a first menu corresponding to a first message queue object;
receiving a first parameter, wherein the first parameter is entered by a user in the first menu;
creating the first message queue object based on the first parameter;
selectively prompting a user with a plurality of menus corresponding to a plurality of objects based on the first object created, wherein the plurality of objects are message queue (MQ) objects;
receiving at least one parameter in each of the plurality of menus for one of the plurality of objects; and
creating the plurality of objects utilizing the plurality of menus.

7. The method of claim 6, wherein the at least one parameter is entered by a user in a first menu of the plurality of menus, and the at least one parameter is subsequently pre-populated into a second menu of the plurality of menus.

8. The method of claim 6, wherein the at least one parameter is a default value.

9. The method of claim 6, wherein a security script is generated for the plurality of objects.

10. The method of claim 6 further comprising:
pre-staging deployment for the plurality of objects after the plurality of objects are created, wherein the plurality of objects are pre-deployed, deployed immediately, or deployed at a scheduled date and time.

11. The method of claim 6, wherein the plurality of objects provide a working MQ infrastructure.

12. The method of claim 6, wherein the plurality of objects are selected from a group consisting of an alias queue object, a local queue object, a remote queue object, a transmit queue object, a sender channel object, a server connection channel object, a server channel object, a receiver channel object, a cluster queue object, a cluster sender channel object, a cluster receiver channel object, and a combination thereof.

13. A computer-readable medium having computer-executable instructions for performing a method for automated scripting of message queue (MQ) objects, the method comprising:
providing a first menu corresponding to a first message queue object;
receiving a first parameter, wherein the first parameter is entered by a user in the first menu;
creating the first message queue object based on the first parameter;
selectively prompting a user with a plurality of menus corresponding to a plurality of objects, based on the first object created, wherein the plurality of objects are message queue (MQ) objects;
receiving at least one parameter in each of the plurality of menus for one of the plurality of objects; and
creating the plurality of objects utilizing the plurality of menus.

14. The computer-readable medium of claim 13, wherein the at least one parameter is entered by a user in a first menu of the plurality of menus, and the at least one parameter is subsequently pre-populated into a second menu of the plurality of menus.

15. The computer-readable medium of claim 13, wherein the at least one parameter is a default value.

16. The computer-readable medium of claim 13, wherein a security script is generated for the plurality of objects.

17. The computer-readable medium of claim 13 further comprising:
pre-staging deployment for the plurality of objects after the plurality of objects are created, wherein the plurality of objects are pre-deployed, deployed immediately, or deployed at a scheduled date and time.

18. The computer-readable medium of claim 13, wherein the plurality of objects provide a working MQ infrastructure.

19. The computer-readable medium of claim 13, wherein the plurality of objects are selected from the group consisting of an alias queue object, a local queue object, a remote queue object, a transmit queue object, a sender channel object, a server connection channel object, a server channel object, a receiver channel object, a cluster queue object, a cluster sender channel object, a cluster receiver channel object, and a combination thereof.

* * * * *